US010044553B2

(12) United States Patent
Abichandani et al.

(10) Patent No.: US 10,044,553 B2
(45) Date of Patent: Aug. 7, 2018

(54) MEDIA RESOURCE RESERVATION REQUEST FAILURE HANDLING FOR VOICE OVER MOBILE WIRELESS NETWORK

(71) Applicant: United States Cellular Corporation, Chicago, IL (US)

(72) Inventors: Jaideep Abichandani, St. Charles, IL (US); Girum Hailemariam, Carpentersville, IL (US); Sanjay Prasad, Crystal Lake, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 65 days.

(21) Appl. No.: 15/159,477

(22) Filed: May 19, 2016

(65) Prior Publication Data

US 2017/0339740 A1 Nov. 23, 2017

(51) Int. Cl.
*H04W 76/10* (2018.01)
*H04L 12/24* (2006.01)
(Continued)

(52) U.S. Cl.
CPC ........ *H04L 41/0627* (2013.01); *H04L 41/026* (2013.01); *H04W 4/12* (2013.01);
(Continued)

(58) Field of Classification Search
CPC .... H04W 76/027; H04W 76/02; H04W 80/10
See application file for complete search history.

(56) References Cited

U.S. PATENT DOCUMENTS

2003/0193696 A1* 10/2003 Walker ............... H04M 7/1245
358/402
2010/0182912 A1* 7/2010 Hongisto ............ H04L 47/15
370/242
(Continued)

FOREIGN PATENT DOCUMENTS

KR 20090058610 A * 6/2009

OTHER PUBLICATIONS

Henrik Back, Ming Zhao; Voice mail system for IP Multimedia Subsystem; May 2008; Department of Information Technology, Uppsala Universitet.*

*Primary Examiner* — Hassan Kizou
*Assistant Examiner* — Deepa Belur
(74) *Attorney, Agent, or Firm* — Leydig, Voit & Mayer, Ltd.

(57) ABSTRACT

A method carried out by a telephony application server (TAS) is described that facilitates handling a digital voice network media resource reservation request failure notification, issued by a call session control function, arising from a connection request from an originating mobile user equipment to a terminating mobile user equipment. The method includes the TAS receiving a connection request response message including the digital voice network connection request failure notification. The TAS detects a media resource reservation request failure error condition based on the connection request response message containing the digital voice network media resource reservation request failure notification. Thereafter, the TAS issues a configured error response message to initiate an alternative message connection between the originating mobile user equipment and a message file service, where the message file service comprises an interface facilitating receiving a message from
(Continued)

the originating mobile user equipment to the terminating mobile user equipment.

27 Claims, 6 Drawing Sheets

(51) Int. Cl.
*H04W 4/12* (2009.01)
*H04W 76/18* (2018.01)
*H04W 80/10* (2009.01)

(52) U.S. Cl.
CPC ........... *H04W 76/10* (2018.02); *H04W 76/18* (2018.02); *H04W 80/10* (2013.01)

(56) References Cited

U.S. PATENT DOCUMENTS

| | | | | |
|---|---|---|---|---|
| 2013/0023265 | A1* | 1/2013 | Swaminathan | H04W 76/027 455/423 |
| 2014/0161072 | A1* | 6/2014 | Przybysz | H04W 28/16 370/329 |
| 2015/0295847 | A1* | 10/2015 | Shen | H04L 47/72 370/230 |
| 2016/0029228 | A1* | 1/2016 | Mufti | H04W 24/04 370/225 |
| 2016/0277587 | A1* | 9/2016 | Alexander | H04M 3/2218 |
| 2017/0181214 | A1* | 6/2017 | Kim | H04W 76/027 |

* cited by examiner

MEDIA RESOURCE RESERVATION REQUEST FAILURE HANDLING FOR VOICE OVER MOBILE WIRELESS NETWORK

FIELD OF THE INVENTION

This invention relates generally to the field of mobile wireless communications networks and related services. More particularly, the invention is directed to supporting digital voice connections over digital mobile wireless digital communication technologies (e.g., Long Term Evolution—LTE).

BACKGROUND OF THE INVENTION

Great strides have been made in the area of mobile wireless communications to ensure high availability of services with very rare instances where an attempt to connect, in particular an attempt to connect a voice call request, fails. However, when mobile wireless communications entities are unable to successfully reserve a requested media resource to support a connection request by user equipment, failure protocols/procedures are instituted by service providers to handle particular error conditions. In the case of the mobile wireless technology's $3^{rd}$ Generation Partnership Project (3GPP) Technical Specification, an IP Multimedia Sub-system (IMS) specification includes error codes that are provided by the mobile wireless communication services when particular failure conditions are detected on intermediate nodes between two mobile wireless devices (user equipment). The mobile wireless communication system renders and relays appropriate error codes to the user equipment that issued the voice call connection request. However, error handling on user equipment, after receiving such error codes, has proven to be unsatisfactory and results in a poor overall user experience in cases when a request for creating a voice connection fails. For example, when a "voice over LTE" (VoLTE) network receives an error response to a DIAMETER request, which is part of a call setup initiated in response to a request from a VoLTE subscriber user equipment (e.g. a smart phone), the originating user equipment receives a Session Initiation Protocol (SIP) error code. It is up to the user equipment to initiate error handling, resulting in a variety of responses (if any) based upon particular providers of the user equipment that receive such error codes.

SUMMARY OF THE INVENTION

Embodiments of the invention are used to provide a method, non-transitory computer readable medium, and a computer system for handling a digital voice network media resource reservation request failure notification, issued by a call session control function, arising from a connection request from an originating mobile user equipment to a terminating mobile user equipment. The method comprises receiving a connection request response message including the digital voice network connection request failure notification. The method further includes detecting a media resource reservation request failure error condition based on the connection request response message containing the digital voice network media resource reservation request failure notification. The method further includes issuing, in response to the detecting, a configured error response message to initiate an alternative message connection between the originating mobile user equipment and a message file service, where the message file service comprises an interface facilitating receiving a message from the originating mobile user equipment to the terminating mobile user equipment.

The invention is embodied in computer-executable instructions stored on a non-transitory computer readable medium facilitating carrying out the steps of the above-summarized method. The invention is further embodied in a networked node including a processor and computer-readable medium configured to carry out the steps of the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Exemplary embodiments of the invention described herein address handling of detected media resource request failure conditions arising from a voice connection request from user equipment (e.g. smart phone) to initiate a voice call connection to another user equipment. The examples provided herein utilize DIAMETER protocol-based call initiation. The DIAMETER protocol is used to carry out: authentication, authorization, and accounting (AAA); policy application; and implement resource management. However, the principles of the present invention are not limited to the well known DIAMETER protocol.

Multiple types of failure conditions have been observed in various VoLTE environments. A number of such errors arise from implementation of functionality relating to DIAMETER interfaces. One such observed type of failure concerns an Rx (e.g. DIAMETER) interface between a policy and charging rules function (PCRF) and a Proxy-Call Session Control Function (P-CSCF) on a mobile wireless communications network supporting VoLTE call connections. In an exemplary call/connection management environment, the PCRF structural/functional complex includes: a Signaling Manager, PCRF Application Servers, a database, and a storage area network (SAN) storage. The Signaling Manager carries out a lightweight DIAMETER Routing Agent (DRA) role. As such, the Signaling Manager maintains a binding for a Gx (e.g. DIAMETER interface between P-GW and PCRF in an IP-CAN) and Rx connection. Thus, the Signaling Manager ensures the Gx and Rx messages are handled by a same PCRF Application Server (in cases where multiple PCRF Application Servers are present).

Figure 1:
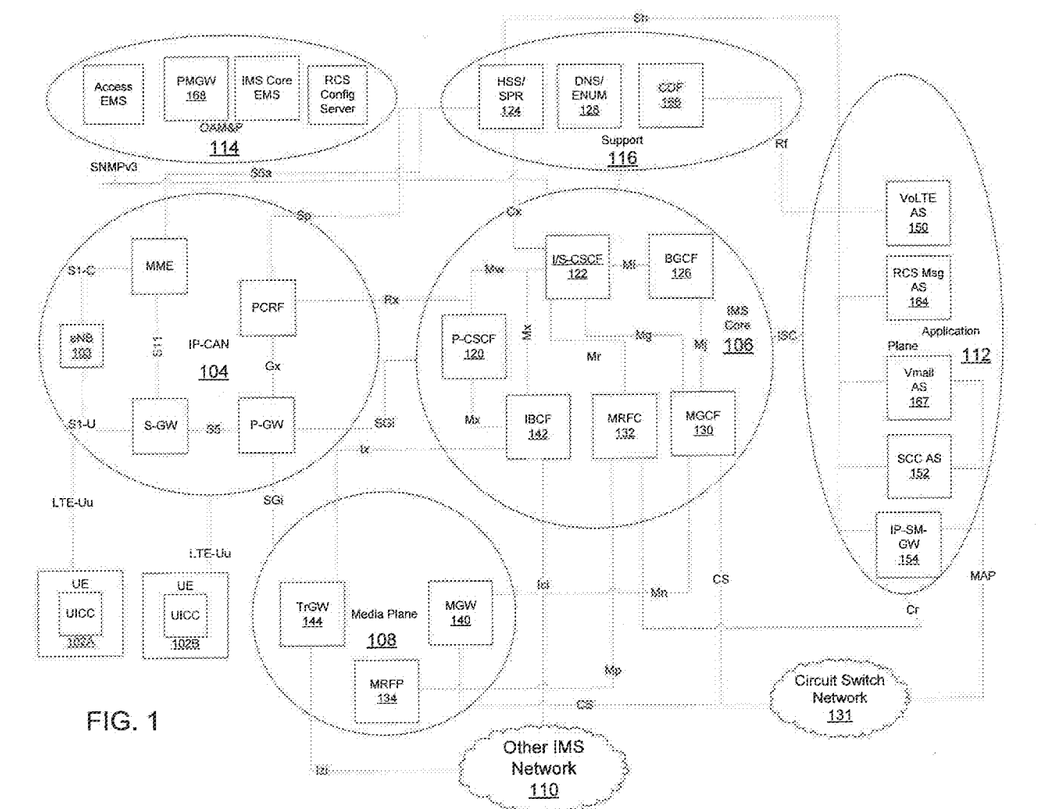
FIG. 1 is a schematic diagram illustrating a mobile wireless communications network environment.

Turning to FIG. 1, an exemplary (LTE) network environment is schematically depicted that includes monitoring and management components facilitating support of VoLTE call media resource reservation request failures arising from voice connection requests from an originating side user equipment (OS-UE) 102A to a terminating side user equipment (TS-UE) 102B via a terminating user equipment. In FIG. 1, the OS-UE 102A and the TS-UE 102B are shown as being in an area served by a same eNodeB 103. In many cases, the OS-UE and TS-UE are connected to different eNodeB radio access network elements, and are potentially connected to different mobile wireless service provider networks.

The processing components in the exemplary LTE network depicted in FIG. 1 are logically grouped in six categories. First, an LTE Access Plane 104, also referred to as an IP connectivity access network (IP-CAN) and more generally a radio access network (RAN), includes E-UTRAN and EPC components of the LTE network. The LTE Access Plane 104 provides IP connectivity between the OS-UE 102A and various structural functional components of an LTE mobile wireless network. Second, an IMS Core 106 comprises signaling components involved in setting up a VoLTE call. Third, a Media Plane 108 comprises structural components involved with building and maintaining a bearer path between the LTE network environment 100 and other IP multimedia subsystem networks 110 supported by other mobile wireless network service providers. Fourth, an Application Plane 112 comprises structural components supporting features for voice and messaging calls. The Application Plane 112 is responsible for implementing voice call features and processing logic. Fifth, an OAM&P Plane 114 comprises a set of components carrying out "operational alarm management and provisioning" components of the LTE network environment 100. Sixth, a Support Plane 116 comprises a set of servers for implementing services relating to: databases, routing and call charging support for all multimedia services.

Below is a description of sub-elements contained within the above generally described six categories of logical entities that provide VoLTE/RCS services to the OS-UE 102A seeking to establish a voice connection to a TS-UE (e.g. TS-UE 102B) in a same or different mobile wireless service provider network.

The IMS Core 106 includes a Proxy Call Session Control Function (P-CSCF) 120. The P-CSCF 120 is a first contact point within the IMS Core 106 during call connection initiation. The P-CSCF 120 operates as a SIP proxy by forwarding SIP messages between the OS-UE 102A and the IMS Core 106. The P-CSCF 120 also maintains security associations between the P-CSCF 120 and OS-UE 102A. The P-CSCF 120 incorporates an Application Function aspect of a Policy and Charging Control (PCC) by authorizing bearer service resources and performing QoS management over a requested voice connection between the OS-UE 102A and a TS-UE.

An Interrogating/Serving Call Session Control Function (I/S-CSCF) 122 includes both "interrogating" and "serving" parts. The interrogating part of the I/S-CSCF 122 functions as a contact point within an operator's network for all OS-UE requests for connections destined to either a TS-UE within a mobile wireless data network operator's network or a roaming TS-UE currently located within the mobile wireless data network operator's service area. Upon receiving an IMS registration request, the "interrogating" part of the I/S-CSCF 122 determines a serving call session control function (S-CSCF) in a terminating-side network to which the registration request from the OS-UE is to be routed. For registration requests identifying another mobile wireless device as the terminating point for a voice call, the interrogating part of the I/S-CSCF 122 queries a home subscriber server (HSS) 124 of the support plane 116 to determine the identity of an S-CSCF upon Which the requesting OS-UE 102A is registered.

The "serving" part of the I/S-CSCF 122 supports voice call sessions by performing session set-up, session teardown, session control and routing functions. The serving part of the I/S-CSCF 122 invokes applications supported by servers associated with the Application Plane 112 based on an initial filter criteria received from the HSS 124. The serving part of the I/S-CSCF 122 operates as a SIP registrar for the OS-UE 102A that originated the VoLTE call. The serving part of the I/S-CSCF 122 queries the HSS 124 for applicable mobile wireless service subscriber/UE profiles and handles calls involving the corresponding user equipment once they have been registered. The serving part of the I/S-CSCF 122 accesses subscription information to determine appropriate forwarding/routing of VoLTE call connection set up requests originating through the I/S-CSCF 122.

A Breakout Gateway Control Function (BGCF) 126 processes requests for routing from the serving part of the I/S-CSCF 122 for cases were the I/S-CSCF 122 determines the session cannot be routed using a DNS/ENUM 128. The ENUM DNS translates ordinary (e.g. E.164) telephone numbers into IP addresses according to, for example, a SIP addressing scheme. ENUM is an IETF standard (RFC 2916) for mapping the public telephone number space into the Domain Name System (DNS) address space. The BGCF 126 determines a next hop for routing a SIP invite message. This determination may be based on a variety of information including information: received in the protocol, administrative information, and/or database access. For public switch telephone network (PSTN) terminations, the BGCF determines a network in which PSTN/CS domain breakout is to occur. If the routing determination is such that a breakout is to occur in a same mobile wireless service provider network in which the BGCF 126 is located, then the BGCF 126 selects a media gateway control function (MGCF), e.g., an MGCF 130, responsible for interworking with the PSTN/CS domain. If the routing determination results in a break out in another mobile wireless service provider network, the BGCF 126 forwards session signaling to another BGCF in the other network. If the routing determination results in the session being destined for termination in another IMS network (e.g., the other IMS network 110), then the BGCF 126 forwards the message to an I/S-CSCF in the other IMS network.

A Media Resource Function (MRF) comprises a Multimedia. Resource Function Controller (MRFC) 132 in the IMS Core 106 and a Multimedia Resource Function Processor (MRFP) 134 in the media plane 108. The MRFC 132 controls media stream resources in the MRFP 134. The MRFC 132 interprets information coming from an application server (AS) in the Application plane 112 and the I/S-CSCF 122 (e.g. session identifier) and controls the MRFP 134 accordingly. The MRFP 134 provides a variety of service support functions including: multimedia transcoding, multiparty multimedia mixing, network announcements/tones, and floor control for managing access rights to shared resources in a conferencing environment.

The MGCF 130 supports control plane interworking between the IMS core 106 and a legacy circuit network 131. By way of specific example, the MGCF 130 executes protocol mapping between SIP and ISUP call control protocols. The ISUP protocol supports signaling for providing voice and non-voice services in telephone communications. ISUP is an extension of SS7, used as the interface protocol for voice and data within, and for ingression or egression to/from, the Public Switched Telephone Network (PSTN.). The MGCF 130 also controls a Media Gateway node according to, for example, the H.248 protocol.

At the media plane 108, a Media Gateway (MGW) 140 supports user plane interworking between the IMS core 106 and legacy circuit network bearers (e.g., the legacy circuit network 131).

An Interconnection Border Control Function (IBCF) 142 (in the IMS core 106) and a Transition Gateway (TrGW) 144 (in the media plane 108) manage control/media plane functionality at a point of connection to the other IMS network 110.

Turning attention to the Application plane 112, a Telephony Application Server (TAS), such as a voice over LTE application server (VoLTE AS) 150 is an IMS Application Server in the Application plane 112 supporting multimedia telephony services as defined by 3GPP. The VoLTE AS 150 is a TAS that provides both the origination and termination features for all VoLTE calls. By way of example, the TAS includes a processor and is variously configured with a computer-readable medium (e.g. a non-transitory computer readable medium) having stored thereon computer-executable instructions for carrying out the TAS-related operations/functions described herein below with reference to the sequence drawings in FIGS. 2-5.

A Service Centralization and Continuity Application Server (SCC AS) 152 provides an Originating Service Domain Selection, a Terminating Service Domain Selection and a Terminating Access Domain Selection function for users whose terminals/devices have the capability of attaching to LTE or CDMA 1xRTT, depending on radio access technology availability.

An SMS Gateway (IP-SM-GW) 154 supports SMS interworking between the IMS network and a legacy circuit network (e.g. the legacy circuit network 131).

An RCS Messaging AS (RCS AS) 164, of the Application plane 112, supports RCS messaging related services and comprises: Standalone Messaging, 1:1 Chat, Group Chat, File Transfer, Image Transfer, etc.

A Charging Data Function (CDF) 166 receives charging triggers from charging triggering function sources such as the VoLTE AS 150 via an Rf reference point interface/message. In response to such charging trigger messages, the CDF 166 generates charging records on identified user accounts for subsequent rating operations on the potentially chargeable event.

A voicemail application server (Vmail AS) 167 operates within the application plane 112 to provide a digital repository of recorded voicemail messages for subscribers to the mobile wireless communication network services of the system depicted in FIG. 1.

A Provisioning Mediation Gateway (PMGW) 168 provides a provisioning abstraction layer between a TOPS provisioning system and network elements. The PMGW 168 receives provisioning requests from an Amdocs Activation Manager and provisions IMS network elements. In an exemplary embodiment, where handling of media resource reservation request failure errors is configured on an individual user/mobile terminal basis (e.g., connect to vmail, email, text message service for the specified termination-side mobile terminal), the PMGW 168 provides an interface for defining/storing a customized media resource reservation request failure error response configuration on an individual mobile terminal-specific basis. In that regard, while the examples provided herein specify routing a connection request to voicemail in response to a media resource reservation request failure error, supporting a variety of potential media resource reservation request failure error response actions are contemplated including: voicemail, email, text message, etc.

The system summarized in FIG. 1 generally depicts known LTE mobile wireless network entities. Thus, the above description is meant to be summary in nature—as opposed to being exhaustive—since the described elements are generally well known in the mobile wireless communications field.

Figure 2:
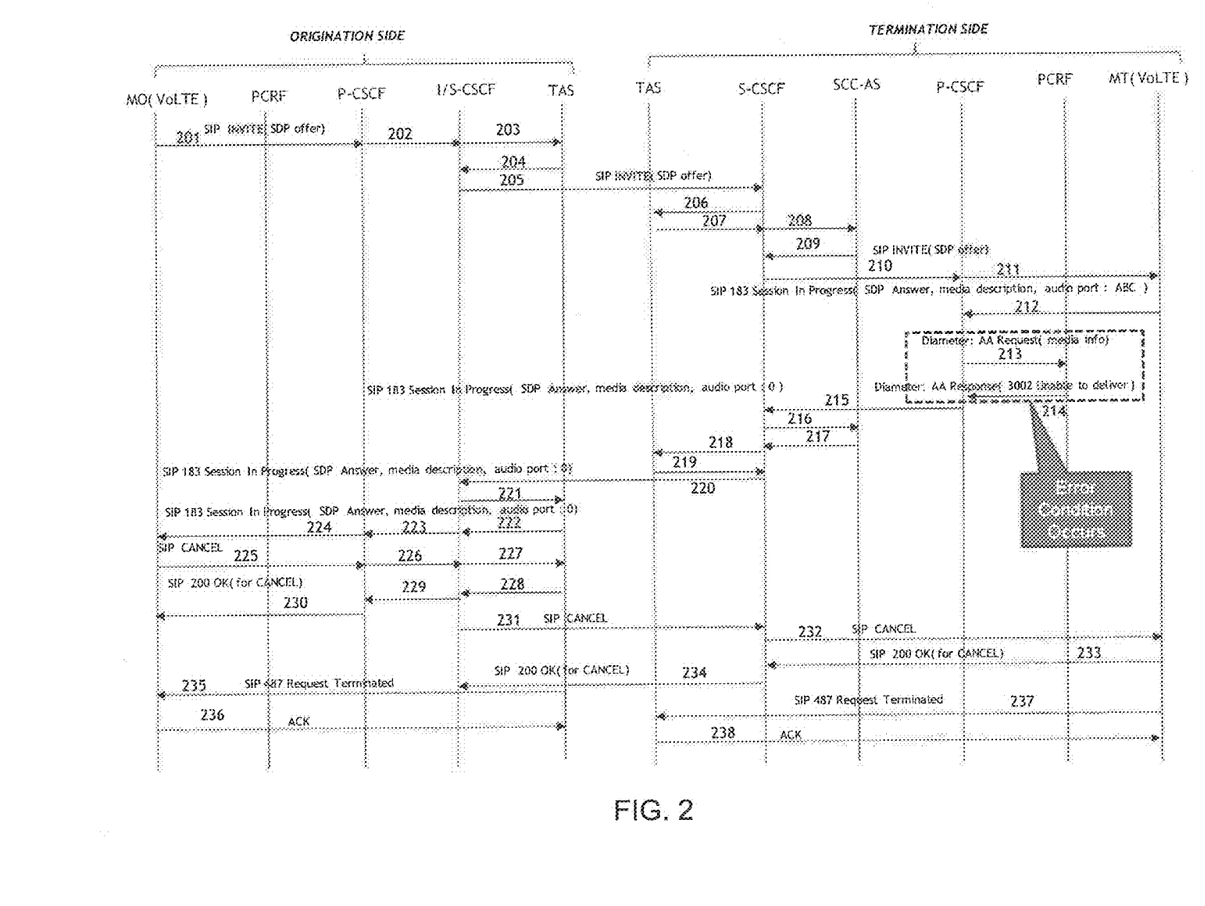
FIG. 2 is a sequence diagram depicting a first known process flow for a set of transactions in accordance with a first illustrative scenario for a VoLTE voice connection media resource reservation request failure handling operation.
Figure 3:
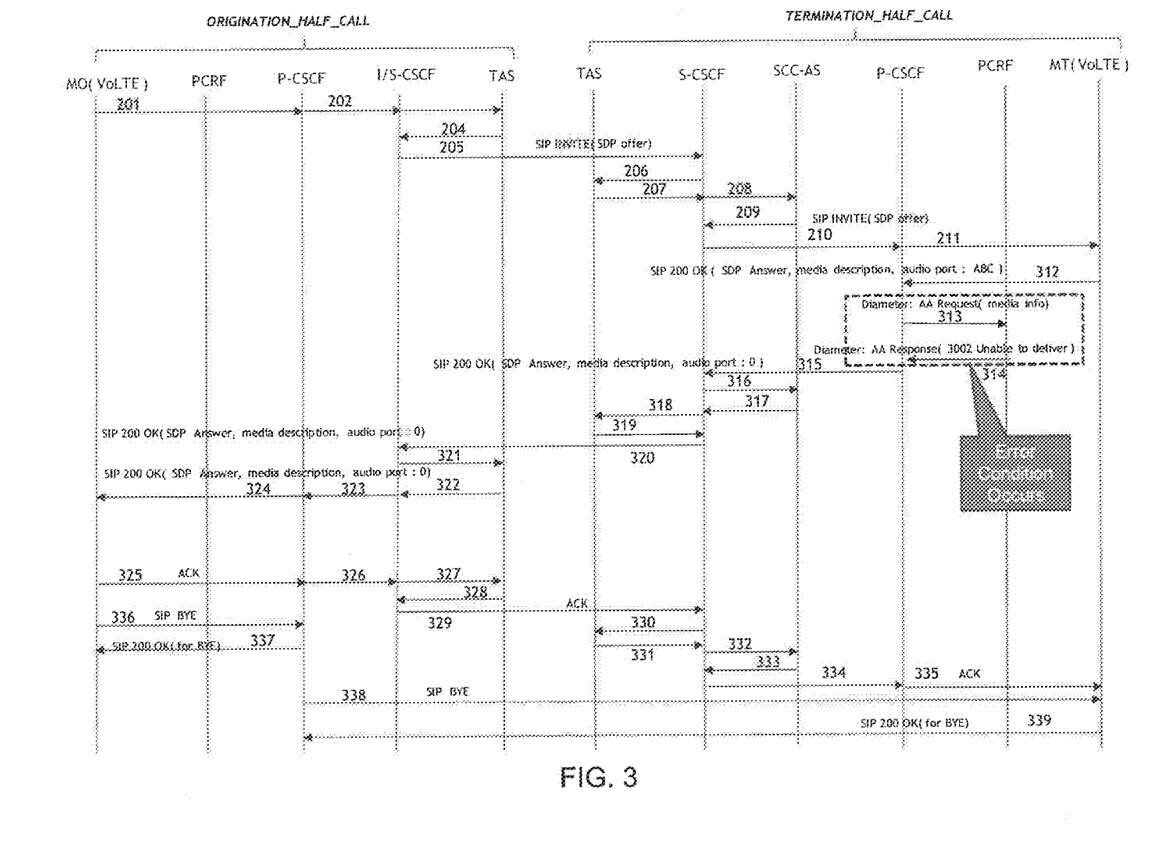
FIG. 3 is a sequence diagram depicting a second known process flow for a set of transactions in accordance with a first illustrative scenario for a VoLTE voice connection media resource reservation request failure handling operation.

Having described exemplary structural/functional elements of an exemplary VoLTE network suitable for carrying out exemplary implementations of VoLTE error handling, reference is now made to FIGS. 2 and 3 that describe two exemplary VoLTE connection request error scenarios. In a first error scenario, summarized in FIG. 2, the error condition is conveyed in a SIP 183 message. In a second error scenario, summarized in FIG. 3, the error condition is conveyed in a SIP 200 OK message. Two potential solutions for both error scenarios are thereafter described with reference to FIGS. 4 and 5. In both scenarios/solutions, error conditions arise from a call request from a mobile originating (MO) user equipment (e.g. OS UE 102A) to a mobile terminating (MT) user equipment for a VoLTE environment incorporating the DIAMETER protocol.

Turning to FIG. 2, a sequence diagram summarizes a series of operations and associated messaging transactions for a first VoLTE error condition handling scenario associated with a request by the MO user equipment (e.g. OS-UE 102A) to establish a VoLTE connection with the MT user equipment. In the illustrative example provided in FIG. 2, the MO and MT user equipment are, at the time of call initiation, connected to distinct IMS core networks (see e.g., IMS core 106). However, the request may also arise in a situation where both the MO and MT user equipment are both currently served by a same IMS core.

With continued reference to the sequence diagram depicted in FIG. 2, during a stage 201, the MO UE issues a SIP invite (e.g., SDP offer including media capabilities) message to an origination-side (OS) P-CSCF (e.g. P/E-CSCF 120) to initiate call set up with an identified MT UE. During 202, the OS P-CSCF forwards the SIP invite message to an OS S-CSCF (e.g. I/S-CSCF 122). During 203 the S-CSCF forwards the SIP invite message to an OS telephony application server (TAS) such as the VoLTE AS 150. The forwarding of the SIP invite message during 203 is based upon initial filter criteria applied by the OS S-CSCF to the SIP invite. Thereafter, during 204 the OS TAS applies supplementary features, based upon the MO UE identity, before returning the (potentially modified) SIP invite back to the OS S-CSCF.

During 205, the OS S-CSCF forwards the potentially modified SIP invite, received from the TAS during 204, from the originating-side (OS) IMS core to a terminating-side (TS) IMS core. In particular, the OS S-CSCF forwards the SIP invite (e.g., SDP offer) to a TS S-CSCF identified in a response to a query issued to an HSS (e.g. HSS/SPR 124) by an I-CSCF (e.g. IS-CSCF 122).

During 206, the terminating-side processing of the SIP invite commences. In particular, during 206 the TS S-CSCF issues the SIP invite (received during 205) to a TS TAS. During 207 the TS TAS applies terminating-side features/services associated with the MT UE identified in the SIP invite and the TS TAS returns the potentially further modified SIP invite to the TS S-CSCF. During 208 the TS S-CSCF forwards the potentially further modified SIP invite to an SCC AS (see SCC AS 152) according to an initial filter criteria rule. Thereafter, during 209 the SCC AS determines whether a domain (e.g., VoLTE) selection needs to be performed based upon the identified MT UE and the SCC AS returns the SIP invite to the TS S-CSCF with a proper domain selection. During 210 the TS S-CSCF forwards the SIP invite (received from the SCC AS during 209) to a TS P-CSCF. During 211, the TS P-CSCF issues the SIP invite (received from S-CSCF during 210 and including an SDP offer) to the identified MT UE. During 212, the MT UE processes the SIP invite/SDP offer and issues a SIP 183 Session In Progress response message to the TS P-CSCF.

In response to receiving the "SIP 183 Session In Progress" response message, during 213 the TS P-CSCF issues a DIAMETER AA Request to a TS PCRF to set up a dedicated bearer for an identified media. In a particular error scenario where the TS PCRF is unable to meet the DIAMETER AA Request (e.g., the request by the MO UE to reserve a media resource cannot be fulfilled), during 214 the TS PCRF issues a DIAMETER AA response 3002 "Unable to Deliver"—or any other appropriate DIAMETER protocol error code to the TS P-CSCF.

The response message (containing the error code), in turn, causes transmission/reception of a series of cascading error/failure notification messages beginning at the TS P-CSCF and ending at the MO UE that originated the request to connect to the MT UE. In that regard, during 215 the TS P-CSCF modifies the SDP to indicate SIP 183 Session in Progress, sets an audio port to "0" to indicate that the network is unable to support the requested flow over the indicated media, and forwards the SIP 183 Session in Progress message to the TS S-CSCF. The SIP 183 Session in Progress message thereafter passes, during stages 216, 217, 218, 219 and 220 back to the originating side—in particular, the OS S-CSCF (e.g. I/S-CSCF 122 that issued the SIP invite to the terminating side during 205.

During 221 the OS S-CSCF forwards the SIP 183 Session in Progress message, including the SDP Answer that indicates the SIP 183 Session in Progress error code and audio port equal to "0", to the OS TAS. In response, during 222 the OS TAS potentially modifies the SDP Answer according to supplementary features, based upon the MO UE identity, before returning the (potentially modified) SIP message back to the OS S-CSCF. During 223, the OS S-CSCF sends the above-described SIP 183 Session in Progress error message to the OS P-CSCF, and during 224 the OS-CSCF passes the SIP 183 Session in Progress error message to the MO UE.

In response to receiving the SIP 183 Session in Progress error message including the audio port equal to "0" value, the MO UE initiates a VoLTE call teardown operation sequence. In that regard, during 225 the MO UE issues a SIP "Cancel" message to the OS P-CSCF. During 226, the OS P-CSCF sends the Cancel message to the OS S-CSCF, and during 227 the OS S-CSCF forwards the Cancel message to the OS TAS.

During 228, the OS TAS processes the SIP Cancel message and returns a SIP 200 OK message to the OS S-CSCF, acknowledging the SIP Cancel message issued by the MO UE. The SIP 200 OK passes back to the MO UE during stages 229 and 230 via the OS S-CSCF and OS P-CSCF.

Additionally, the call teardown is propagated to the terminating side. Thus, during 231 the OS S-CSCF forwards the SIP Cancel message, previously received in association with stage 226, to the TS S-CSCF. During 232 the TS S-CSCF forwards the SIP Cancel message to the MT UE, and during 233 the MT UE issues a SIP 200 OK message to the TS S-CSCF, acknowledging the SIP Cancel message from the TS S-CSCF. During 234 the TS S-CSCF forwards, to the OS S-CSCF, the SIP 200 OK message acknowledging the SIP Cancel request issued by the OS-CSCF during 231.

Additionally, independently of the teardown messaging passed from the OS to the TS infrastructure, during 235 the MO UE sends a SIP 487 Request Terminated message to the OS TAS. The OS TAS, during 236, sends an acknowledgement message back to the MO UE regarding the SIP 487 Request Terminated message sent during 235.

Similarly, during 237 the MT UE sends a SIP 487 Request Terminated message to the TS TAS. The TS TAS, during 238, sends an acknowledgement message back to the MT UE regarding the SIP 487 Request Terminated message sent during 237.

Thus, in summary of the above description of an exemplary error scenario described above with reference to FIG. 2, when a request by the MO UE to connect fails due to an inability to provide a bearer for an identified media, from a user experience perspective, the MO UE initiated call was silently torn down without any form of audio feedback and/or alternative messaging media/channel. In the first scenario summarized in FIG. 2, the MO UE is not provided an opportunity to connect to MT's voicemail or routed to any alternative messaging media/channel that could potentially provide a more satisfying alternative to the silent failure/disconnection associated with the first error handling scenario.

Turning to FIG. 3, a sequence diagram summarizes a series of operations and associated messaging transactions for a second VoLTE error condition handling scenario associated with a request by the MO user equipment (e.g. OS-UE 102A) to establish a VoLTE connection with the MT user equipment. In the illustrative example provided in FIG. 3, the MO and MT user equipment are, at the time of call initiation, connected to distinct IMS core networks (see e.g., IMS core 106). However, the request may also arise in a situation where both the MO and MT user equipment are both currently served by a same IMS core. Since the initial stages 200-211 are the same in the second scenario, reference is made to the discussion of stages 200-211 above with reference to FIG. 2 for the previous discussion of the initial propagation of the VoLTE request from the MO UE to the MT UE.

With continued reference to FIG. 3, during 312, in response to the TS P-CSCF issuing the SIP invite (including an SDP offer) to the identified MT UE, the MT UE processes the SIP invite/SDP offer and issues a SIP 200 OK response message to the TS P-CSCF.

During 313, in response to receiving the SIP 200 OK response message, the TS P-CSCF issues a DIAMETER AA Request to a TS PCRF to set up a dedicated bearer for an identified media. During 314, in a particular media resource reservation request error scenario where the TS PCRF is unable to meet the DIAMETER AA Request (e.g., the request by the MO UE to set up a VoLTE connection to the MT UE cannot be fulfilled), the TS PCRF issues a DIAMETER AA response 3002 "Unable to Deliver"—or any other appropriate DIAMETER protocol error code to the TS P-CSCF.

The response message (containing the error code), in turn, causes transmission/reception of a series of cascading error/failure notification messages beginning at the TS P-CSCF and ending at the MO UE that originated the request to connect to the MT UE. In that regard, during 315 the TS P-CSCF modifies the SDP to indicate SIP 200 OK, sets an audio port to "0" to indicate that the network is unable to support the requested flow over the indicated media, and forwards the SIP 200 OK message to the TS S-CSCF. The SIP 200 OK message thereafter passes, during stages 316, 317, 318, 319 and 320 back to the originating side—in particular, the OS S-CSCF (e.g. I/S-CSCF 122 that issued the SIP invite to the terminating side during 205.

During 321 the OS S-CSCF forwards the SIP 200 OK message, including the SDP Answer that indicates the SIP 200 OK error code and audio port equal to "0", to the OS TAS. In response, during 322 the OS TAS potentially modifies the SDP Answer according to supplementary features, based upon the MO UE identity, before returning the (potentially modified) SIP 200 OK message back to the OS S-CSCF. During 323, the OS S-CSCF sends the above-described SIP 200 OK error message to the OS P-CSCF, and during 324 the OS-CSCF passes the SIP 200 OK error message to the MO UE.

In response to receiving the SIP 200 OK error message including the audio port equal to "0" value, the MO UE initiates a sequence of VoLTE operations to tear down the voice call setup. In that regard, during 325 the MO UE issues an ACK message to the OS P-CSCF. During 326, the OS P-CSCF sends the ACK message to the OS S-CSCF, and during 327 the OS S-CSCF forwards the ACK message to the OS TAS.

During 328, the OS TAS processes the ACK message (relating to the earlier processed SIP 200 OK) and responds to the OS S-CSCF, acknowledging processing by the OS TAS of the ACK message. Thereafter, during 329 the OS S-CSCF initiates propagating (during stages 330, 331, 332, 333, 334 and 335) the ACK message to TS nodes—ending with receipt of the ACK message by the TS UE during stage 335.

Moreover, after receiving (during 324) the SIP 200 OK error message including the audio port equal to "0" value, the MO UE, during 336 issues a SIP BYE message to the OS P-CSCF. During 337, the OS P-CSCF processes the SIP BYE message and issues a SIP 200 OK message, acknowledging the SIP BYE, back to the MO UE. Additionally, during 338 the OS P-CSCF initiates propagating the SIP BYE message to the MT UE. After receiving the propagated SIP BYE message, during 339 the MT UE initiates propagating SIP 200 OK message responsive to the SIP BYE message back to the OS P-CSCF from which the SIP BYE message originated.

Thus, in summary of the above description of an exemplary error scenario described above with reference to FIG. 3, when a request by the MO UE to connect fails due to an inability to provide a bearer for an identified media, from a user experience perspective, the MO UE initiated call was silently torn down without any form of audio feedback and/or alternative messaging media/channel. In the scenario summarized in FIG. 3, the MO UE is not provided an opportunity to connect to MT's voicemail or routed to any alternative messaging media/channel that could potentially provide a more satisfying alternative to the experienced silent disconnection.

Figure 4:
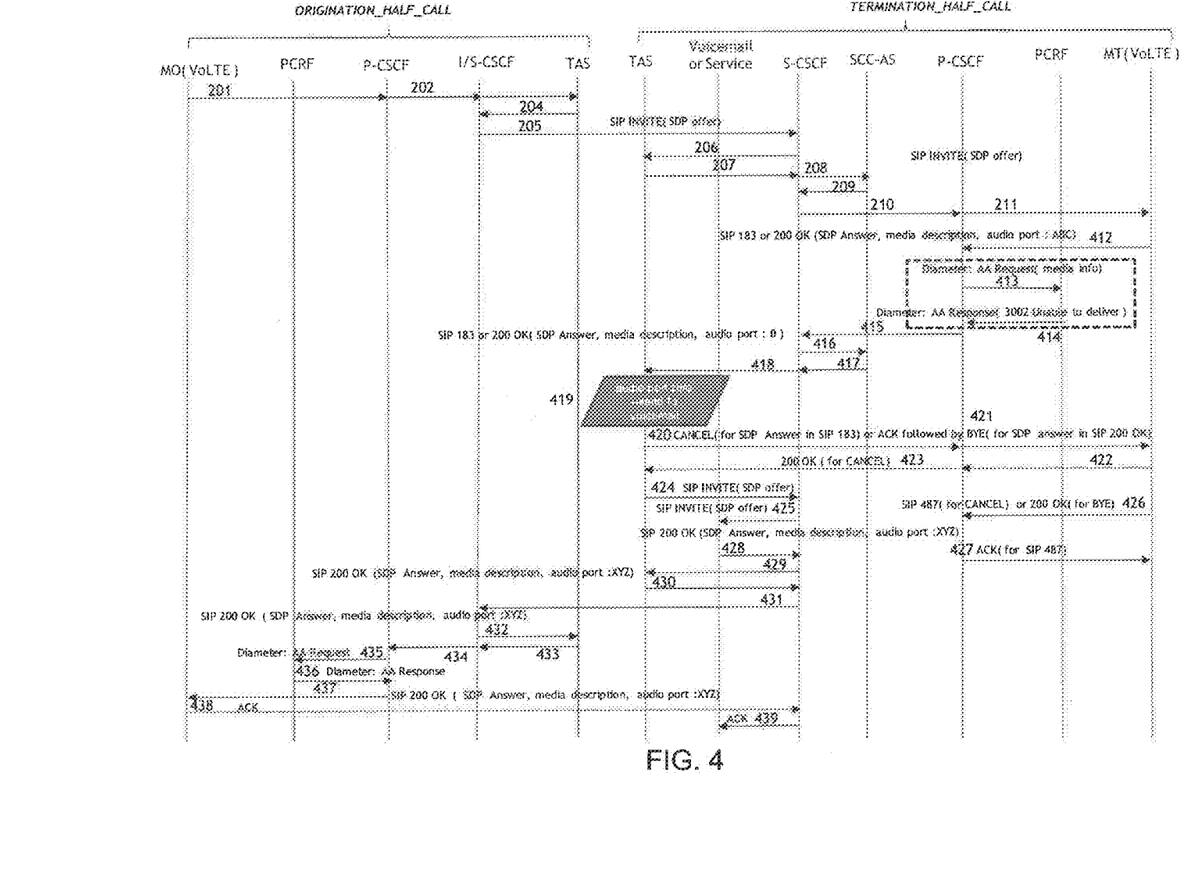
FIG. 4 is a sequence diagram depicting process flow for a set of transactions in accordance with a first new VoLTE failure handling sequence for the VoLTE media resource reservation request failure scenario depicted in FIGS. 2 and 3.
Figure 5:
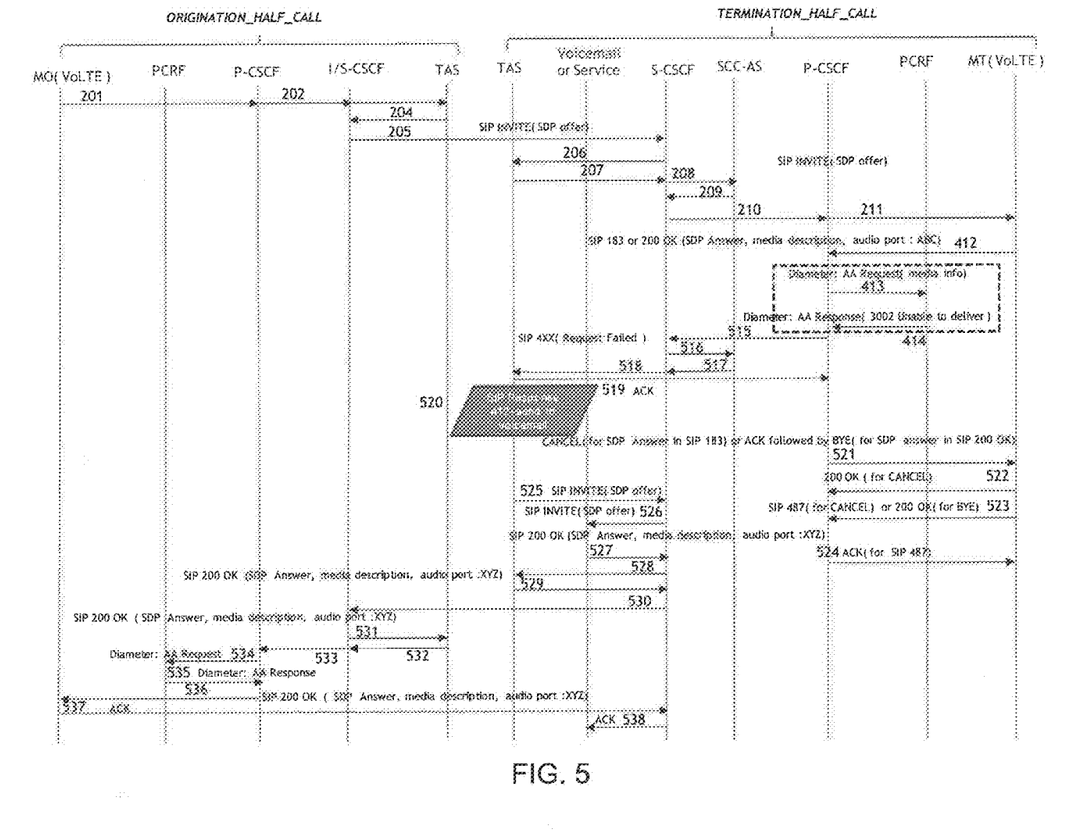
FIG. 5 is a sequence diagram depicting process flow for a set of transactions in accordance with a second new VoLTE failure handling sequence for the VoLTE media resource reservation request failure scenario depicted in FIGS. 2 and 3.

In contrast to the above-summarized sequence including a media resource reservation request failure, two alternative media resource reservation request failure handling approaches are presented herein with reference to FIGS. 4 and 5. In a first alternative voice connection media resource reservation request failure handling operation in a digital voice communication network (see FIG. 4), rather than merely sending the SDP answer with the media port equal to zero, a TAS at the terminating user equipment-side of the requested VoLTE connection processes the SDP Answer (including the media port value equal to zero). However, instead of merely sending the received SDP answer back to the originating user equipment-side of the requested VoLTE connection, the terminating-side TAS establishes a connection to a voicemail server/service for the terminating user equipment. Thus, at the originating user equipment-side the user observes a ringtone followed by a prompt to save a voicemail message for the intended terminating user equipment.

In a second alternative voice media resource reservation request failure handling operation in a digital voice communication network (see FIG. 5), the P-CSCF (in addition to setting MP to "0" when the connection fails) creates a mapping between DIAMETER error codes and SIP error responses. Based on the mapping, in response to the media resource reservation request failure, the P-CSCF generates a SIP error response, such as (for example) "412 Conditional Request Failed" that indicates the condition that led to the failure of the voice connection media resource reservation request to the terminating user equipment. The TS TAS is configured to respond to receiving the SIP error response (including the "412 Conditional Request Failed) issued by the P-CSCF by forwarding the call for connection to the voicemail server/service of the intended terminating user equipment.

Turning to FIG. 4, a sequence diagram summarizes a series of operations and associated messaging transactions, for a first improved VoLTE error condition handling method and structure, associated with a request by the MO user equipment (e.g. OS-UE 102) to establish a VoLTE connection with the MT user equipment. The sequence diagram depicted in FIG. 4 includes a same set of participating elements of an originating side and a terminating side of an attempted VoLTE connection between the MO UE and the MT UE as the elements depicted in FIGS. 2 and 3. Additionally, a Voicemail Application Server (see FIG. 1 Vmail AS 167) supports storing a voicemail message by the MO UE when a connection cannot be established with the MT UE.

In the illustrative example provided in FIG. 4, the MO and MT user equipment are, at the time of call initiation, connected to distinct IMS core networks (see e.g., IMS core 106). However, the request may also arise in a situation where bath the MO and MT user equipment are both currently served by a same IMS core. Since the initial stages 200-211 are the same in the second scenario, reference is made to the discussion of stages 200-211 above with reference to FIG. 2 for the previous discussion of the initial propagation of the VoLTE request from the MO UE to the MT UE.

Before continuing the discussion of FIG. 4, it is expressly noted that the described solution applies to both the first scenario (FIG. 2, SIP 183 Session in Progress) and the second scenario (FIG. 3, SIP 200 OK) described herein above. Therefore, the remaining stages are executed similarly regardless of whether the response to the SIP INVITE results in a SIP 183 Session in Progress or a SIP 200 OK response from the MT UE.

With continued reference to FIG. 4, during 412, in response to the TS P-CSCF issuing the SIP invite (including an SDP offer) to the identified MT UE, the MT UE processes the SIP invite/SDP offer and issues a SIP response to the TS P-CSCF. By way of example, the SIP response may be in the form of a SIP 183 Session in Progress or a SIP 200 OK response message.

During 413, in response to receiving the SIP 183/200 response message, the TS P-CSCF issues a DIAMETER AA Request to a TS PCRF to reserve media resources for an identified media. During 414, in a particular error scenario where the TS PCRF is unable to meet the DIAMETER AA Request (e.g., the request by the MO UE to reserve media resources for a VoLTE connection to the MT UE cannot be fulfilled), the TS PCRF issues a DIAMETER AA response 3002 "Unable to Deliver"—or any other appropriate DIAMETER protocol error code to the TS P-CSCF.

The response message (containing the error code), in turn, causes transmission/reception of a series of cascading error/failure notification messages beginning at the TS P-CSCF. In that regard, during 415 the TS P-CSCF modifies the SDP in the SIP 183/200 message and sets an audio port to "0" to indicate that the network is unable to support the requested flow over the indicated media, and forwards the modified SIP 183/200 message to the TS S-CSCF. The SIP 183/200 message thereafter passes, during stages 416, 417, and 418 through the TS SCC-AS, and then to the TS TAS. The choice of setting the audio port to "0" is implementation-specific and not intended to limit using a variety of alternative audio port value assignments to indicate an inability of the network to provide the requested media resources necessary to support the voice connection between the MO UE and the MT UE in various alternative examples.

During 419, the TS TAS, detects that the SIP 183/200 message contains an audio port equal to zero ("0"), and thereafter (based upon the detected error message code "0") initiates establishing a voice connection to a voicemail server/service during 424. During 420 the TS TAS issues a SIP CANCEL (in the case of SIP 183 Session in Progress) and an ACK followed by a BYE (in the case of SIP 200 OK) to the TS P-CSCF. During 421 the TS P-CSCF forwards the SIP CANCEL/ACK-BYE to the MT UE. In response to receiving the SIP CANCEL/ACK-BYE message, the MT UE terminates the voice call setup. Thereafter, during 422 the MT UE issues a SIP 200 OK (for the CANCEL) to the TS P-CSCF. During 423 the TS P-CSCF forwards the SIP 200 OK to the TS TAS. Additionally, during 426 the MT UE issues a SIP 487 (for the CANCEL) and a SIP 200 OK (for the ACK-BYE) to the TS P-CSCF. The TS P-CSCF processes the termination request and sends a SIP ACK (for the SIP 487) to the MT UE during 427.

With continued reference to FIG. 4, during 424 the TS TAS commences establishing a connection to the voicemail server/service of the MT UE on behalf of the requesting MO UE. In that regard, during 424 the TS TAS issues a SIP INVITE, including an SDP offer, to the TS S-CSCF. During 425 the TS S-CSCF forwards the SIP INVITE to the voicemail server/service for the MT UE. During 428 the voicemail server/service processes the SIP INVITE and returns a SIP 200 OK message to the TS S-CSCF. The SIP 200 OK message includes: an SDP answer, media description and the audio port set to "XYZ", where XYZ is any valid port number/identification configured to handle the subsequent connection of the MO UE to the voicemail server/service for the MT UE. Thereafter, during 429 the TS S-CSCF forwards the SIP 200 OK message to the TS TAS. The TS TAS processes the SIP 200 OK message in accordance with a configuration associated with the MT UE and returns the processed SIP 200 OK message to the TS S-CSCF during 430.

Thereafter, during 431 the TS S-CSCF forwards the processed SIP 200 OK message to the OS S-CSCF. During 432 the OS S-CSCF forwards the received SIP 200 OK message to the OS TAS. Thereafter, the OS TAS potentially modifies the SDP Answer contained in the SIP 200 OK message according to supplementary features, based upon the MO UE identity, before returning the (potentially modified) SIP 200 OK message back to the OS S-CSCF during 433. During 434 the OS S-CSCF forwards the potentially modified SIP 200 OK message to the OS P-CSCF.

Importantly, the OS P-CSCF recognizes the SIP 200 OK message as originating from the TS voicemail server/service (see stage 428). Therefore, during 435 issues a DIAMETER AA Request message to the OS PCRF to initiate setup of a dedicated bearer for the media supporting transmission of a voicemail message.

In response to receiving the DIAMETER AA request message, the OS PCRF sets up the dedicated bearer for the voicemail message connection, and during 436 the OS PCRF issues a DIAMETER AA Answer message including a "Diameter Success" code to the OS P-CSCF. During 437 the OS P-CSCF forwards the previously received SIP 200 OK message (originating from the voicemail server/service) to the MO UE. The MO UE reception and processing of the SIP 200 OK message from the voicemail server/service effectively completes a voicemail connection between the MO UE and the voicemail server/service for transmission of a voicemail message to a storage location on the voicemail server corresponding to the MT UE.

During 438/439, the MO UE communicates a voicemail message to the TS voicemail server/service via the TS S-CSCF.

Thus, in summary of the above description, with reference to FIG. 4, of an exemplary solution to silent teardown of a VoLTE connection attempt described above with reference to FIGS. 2 and 3, when a MO UE's VoLTE request to connect fails due to an inability to provide a bearer for an identified media, from a user experience perspective, the MO UE initiated call results creating a connection between the MO UE and the TS voicemail server/service via an alternative bearer to the one through which a successful VoLTE voice connection would have been created between the MO UE and the MT UE.

Turning to FIG. 5, a sequence diagram summarizes a series of operations and associated messaging transactions, for a second improved VoLTE error condition handling method and structure, associated with a request by the MO UE (e.g. OS-UE 102) to establish a VoLTE connection with the MT UE. The sequence diagram depicted in FIG. 5 includes a same set of participating elements of an originating side and a terminating side of an attempted VoLTE connection between the MO UE and the MT UE as the elements depicted in FIGS. 2 and 3. Additionally, a Voicemail Application Server (see FIG. 1, Vmail AS 167) supports storing a voicemail message by the MO UE when a connection cannot be established with the MT UE.

In the illustrative example provided in FIG. 5, the MO and MT user equipment are, at the time of call initiation, connected to distinct IMS core networks (see e.g., IMS core 106). However, the request may also arise in a situation where both the MO and MT user equipment are both currently served by a same IMS core. Since the initial stages 200-211 are the same in the second scenario, reference is made to the discussion of stages 200-211 above with reference to FIG. 2 for the previous discussion of the initial propagation of the VoLTE request from the MO in to the MT UE.

Before continuing the discussion of FIG. 5, it is expressly noted that the described solution applies to both the first scenario (FIG. 2, SIP 183 Session in Progress) and the second scenario (FIG. 3, SIP 200 OK) described herein above. Therefore, the remaining stages are executed similarly regardless of whether the response to the SIP INVITE results in a SIP 183 Session in Progress or a SIP 200 OK response from the MT UE.

With continued reference to FIG. 5, during 412, in response to the TS P-CSCF issuing the SIP invite (including an SDP offer) to the identified MT UE, the MT UE processes the SIP invite/SDP offer and issues a SIP response to the TS P-CSCF. By way of example, the SIP response may be in the form of a SIP 183 Session in Progress or a SIP 200 OK response message.

During 413, in response to receiving the SIP 183/200 response message, the TS P-CSCF issues a DIAMETER AA Request to a TS PCRF to set up a dedicated bearer for an identified media. During 414, in a particular error scenario where the TS PCRF is unable to meet the DIAMETER AA Request (e.g., the request by the MO UE to set up a VoLTE connection to the MT UE cannot be fulfilled), the TS PCRF issues a DIAMETER AA response 3002 "Unable to Deliver"—or any other appropriate DIAMETER protocol error code to the TS P-CSCF.

The response message (containing the error code), in turn, causes transmission/reception of a series of cascading error/failure notification messages beginning at the TS P-CSCF. In the alternative solution summarized in FIG. 5, the TS P-CSCF is configured with a mapping between DIAMETER response error codes and SIP error response codes (an additional data structure that was not present/utilized in the first solution described above with reference to FIG. 4). In that regard, during 515 the TS P-CSCF creates a SIP 4XX "Request Failed" error message. Even more particularly, the TS P-CSCF creates a SIP 412 "Conditional Request Failed" error message indicating the condition that led to the failure to fulfill the MO UE media resource reservation request to support a voice connection between the MO UE and the MT UE. The choice of a SIP 412 error message code is implementation-specific and not intended to limit using a variety of alternative connection request failure/error indication codes in various alternative examples.

During 515 the TS P-CSCF forwards the SIP 4XX message to the TS S-CSCF. The SIP 4XX message thereafter passes, during stages 516, 517, and 518 through the TS SCC-AS, and then to the TS TAS.

During 519, the TS TAS issues an acknowledgement reply to the TS P-CSCF (regarding the received SIP 4XX Request Failed error message). Additionally, during 520 the TS TAS, processes the SIP 4XX error message, and thereafter initiates establishing a voice connection to a voicemail server/service during 525 (described herein below) based upon the detection of the SIP 4XX error code indicative of "Request Failed" (more particularly 412 "Conditional Request Failed").

During 521 the TS P-CSCF issues a SIP CANCEL (in the case of SIP 183 Session in Progress) and an ACK followed by a BYE (in the case of SIP 200 OK) to the MT UE. During 522, in response to receiving the SIP CANCEL/ACK-BYE message, the MT UE terminates the voice call setup, and the MT UE issues a SIP 200 OK (for the CANCEL) to the TS P-CSCF.

Additionally, during 523 the MT UE issues a SIP 487 (for the CANCEL) and a SIP 200 OK (for the ACK-BYE) to the TS P-CSCF. The TS P-CSCF processes the termination request and sends a SIP ACK (for the SIP 487) to the MT UE during 524.

With continued reference to FIG. 5, during 525 the TS TAS commences establishing a connection to the voicemail server/service of the MT UE on behalf of the requesting MO UE. In that regard, during 525 the TS TAS issues a SIP INVITE, including an SDP offer, to the TS S-CSCF. During 526 the TS S-CSCF forwards the SIP INVITE to the voicemail server/service for the MT UE. During 527 the voicemail server/service processes the SIP INVITE and returns a SIP 200 OK message to the TS S-CSCF. The SIP 200 OK message includes: an SDP answer, media description and the audio port set to "XYZ", where XYZ is any valid port number/identification configured to handle the subsequent connection of the MO UE to the voicemail server/service for the MT UE. Thereafter, during 528 the TS S-CSCF forwards the SIP 200 OK message to the TS TAS. The TS TAS processes the SIP 200 OK message in accordance with a configuration associated with the MT UE and returns the processed SIP 200 OK message to the TS S-CSCF during 529.

Thereafter, during 530 the TS S-CSCF forwards the processed SIP 200 OK message to the OS S-CSCF. During 531 the OS S-CSCF forwards the received SIP 200 OK message to the OS TAS. Thereafter, the OS TAS potentially modifies the SDP Answer contained in the SIP 200 OK message according to supplementary features, based upon the MO UE identity, before returning the (potentially modified) SIP 200 OK message back to the OS S-CSCF during 532. During 533 the OS S-CSCF forwards the potentially modified SIP 200 OK message to the OS P-CSCF.

Importantly, the OS P-CSCF recognizes the SIP 200 OK message as originating from the TS voicemail server/service (see stage 527). Therefore, during 534 issues a DIAMETER AA Request message to the OS PCRF to initiate setup of a dedicated bearer for the media supporting transmission of a voicemail message.

In response to receiving the DIAMETER AA request message, the OS PCRF sets up the dedicated bearer for the voicemail message connection, and during 535 the OS PCRF issues a DIAMETER AA Answer message including a "Diameter Success" code to the OS P-CSCF. During 536 the OS P-CSCF forwards the previously received SIP 200 OK message (originating from the voicemail server/service) to the MO UE. The MO UE reception and processing of the SIP 200 OK message from the voicemail server/service effectively completes a voicemail connection between the MO UE and the voicemail server/service for transmission of a voicemail message to a storage location on the voicemail server corresponding to the MT UE.

During 537/538, the MO UE communicates a voicemail message to the TS voicemail server/service via the TS S-CSCF.

Thus, in summary of the above description, with reference to FIG. 5, of an exemplary solution to silent teardown of a VoLTE connection attempt described above with reference to FIGS. 2 and 3, when a MO UE's VoLTE request to connect fails due to an inability to provide a bearer for an identified media, from a user experience perspective, the MO UE initiated call results creating a connection between the MO UE and the TS voicemail server/service via an alternative bearer to the one through which a successful VoLTE voice connection would have been created between the MO UE and the MT UE.

Having described two exemplary voicemail-based response schemes for media resource reservation request failure errors arising in a VoLTE environment, it is emphasized that the proposed solutions, which are based upon interception, modification and re-direction of media resource reservation request failure error messages issued by a termination-side PCRF, are exemplary in nature. Notably, in addition to redirecting a media resource reservation request for a voice call to a voicemail service, additional/alternative message handling services are contemplated to handle instances where an initial voice call media resource reservation request fails. Such services include: email, text message, etc. Moreover, various systems support a configuration server/service enabling users to specify a particular one of the supported error handling modes on an individual mobile termination user equipment basis.

Moreover, the exemplary media resource reservation request failure handling schemes describe modification of a telephony application server/service providing functionality for detecting a failure to connect ("3002 unable to deliver") error in a VoLTE environment. However, alternative network entities may be configured to provide similar detection, modification and redirection functionality with regard to media resource reservation request failure error messages. Moreover, while described in the context of VoLTE, the described solution is applicable to virtually any digital mobile wireless voice network where a media resource reservation request failure results in tearing down an attempted connection between a MO UE and a MT UE.

Figure 6:
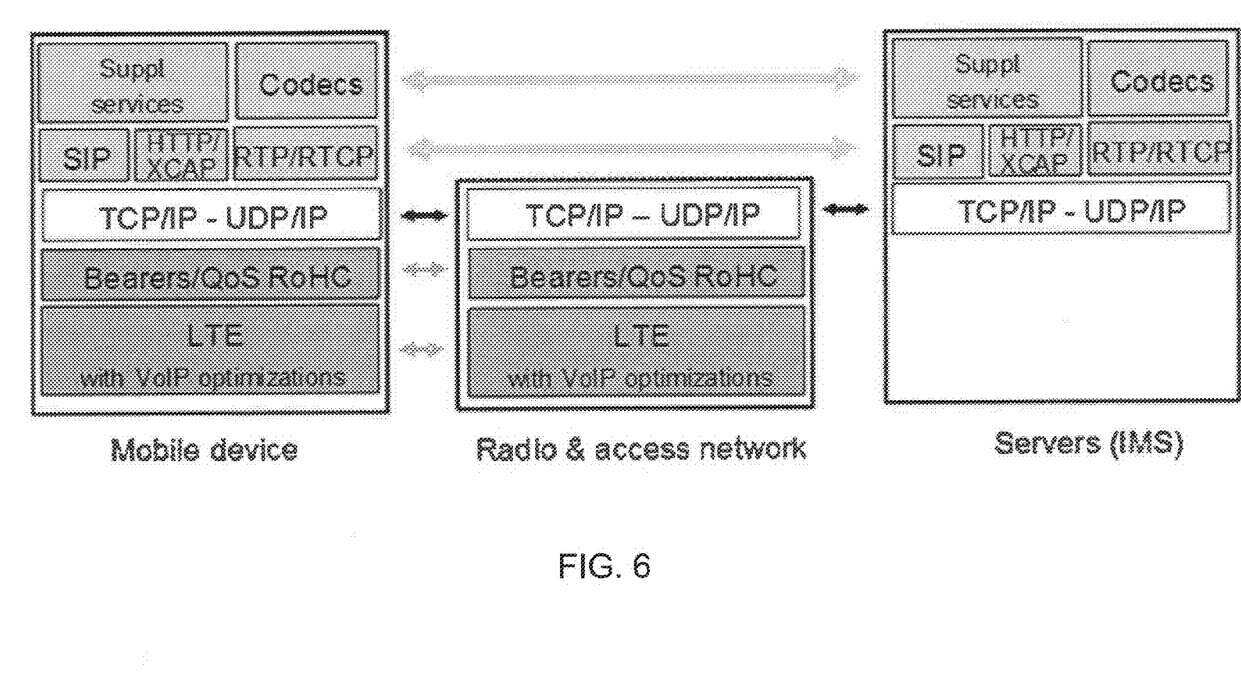
FIG. 6 is an exemplary set of protocol stacks utilized by: user equipment (mobile wireless device), a radio access network, and servers connected to the radio access network and user equipment.

Turning to FIG. 6, an exemplary set of protocol stacks are schematically depicted for the originating user equipment 102, the radio access network (e.g., IP-CAN 104), and the IMS core 106 servers. The various layers and components are standard components and therefore the individual components of the various layers/components are not described herein as they would be well known to those skilled in the art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for handling a digital voice network media resource reservation request failure notification, issued by a call session control function, arising from a connection request from an originating mobile user equipment to a terminating mobile user equipment, the method comprising:
   receiving a connection request response message including the digital voice network connection request failure notification;
   detecting a media resource reservation request failure error condition based on the connection request response message containing the digital voice network media resource reservation request failure notification;
   issuing, by a call terminating side server in response to the detecting, a configured error response message to initiate an alternative message connection between the originating mobile user equipment and a message file service, where the message file service comprises an interface facilitating receiving a message from the originating mobile user equipment to the terminating mobile user equipment.

2. The method of claim 1 wherein the message file service is a voicemail service.

3. The method of claim 1 wherein the message file service is a text message service.

4. The method of claim 1 wherein the message file service is an email message service.

5. The method of claim 1 wherein the digital voice network media resource reservation request is a voice over Long Term Evolution (VoLTE) media resource reservation request.

6. The method of claim 5 wherein the digital voice network media resource reservation request failure notification is a Session Initiation Protocol (SIP) error code.

7. The method of claim 5 wherein the digital voice network media resource reservation request failure notification is a Session Initiation Protocol (SIP) message including an audio port field set to zero.

8. The method of claim 5 wherein, during the issuing, the configured error response message is directed to a serving call session control function (S-CSCF) to initiate establishing the alternative message connection.

9. The method of claim 1 wherein the media resource reservation request failure notification arises from a DIAMETER request.

10. A non-transitory computer-readable medium including computer-executable instructions for carrying out, on a network node including a processor for executing the computer-executable instructions, a method for handling a digital voice network media resource reservation request failure notification, issued by a call session control function, arising from a connection request from an originating mobile user equipment to a terminating mobile user equipment, the method comprising:

receiving a connection request response message including the digital voice network connection request failure notification;

detecting a media resource reservation request failure error condition based on the connection request response message containing the digital voice network media resource reservation request failure notification;

issuing, by a call terminating side server in response to the detecting, a configured error response message to initiate an alternative message connection between the originating mobile user equipment and a message file service, where the message file service comprises an interface facilitating receiving a message from the originating mobile user equipment to the terminating mobile user equipment.

11. The non-transitory computer-readable medium of claim 10 wherein the message file service is a voicemail service.

12. The non-transitory computer-readable medium of claim 10 wherein the message file service is a text message service.

13. The non-transitory computer-readable medium of claim 10 wherein the message file service is an email message service.

14. The non-transitory computer-readable medium of claim 10 wherein the digital voice network media resource reservation request is a voice over Long Term Evolution (VoLTE) media resource reservation request.

15. The non-transitory computer-readable medium of claim 14 wherein the digital voice network media resource reservation request failure notification is a Session Initiation Protocol (SIP) error code.

16. The non-transitory computer-readable medium of claim 14 wherein the digital voice network media resource reservation request failure notification is a Session Initiation Protocol (SIP) message including an audio port field set to zero.

17. The non-transitory computer-readable medium of claim 14 wherein, during the issuing, the configured error response message is directed to a serving call session control function (S-CSCF) to initiate establishing the alternative message connection.

18. The non-transitory computer-readable medium of claim 10 wherein the media resource reservation request failure notification arises from a DIAMETER request.

19. A mobile wireless data network telephony application server (TAS) node configured to operate in a mobile wireless network environment, the TAS comprising:

a processor; and a non-transitory computer readable medium including computer-executable instructions, that when executed by on the processor, carry out a method for handling a digital voice network media resource reservation request failure notification, issued by a call session control function, arising from a connection request from an originating mobile user equipment to a terminating mobile user equipment, the method comprising:

receiving a connection request response message including the digital voice network connection request failure notification;

detecting a media resource reservation request failure error condition based on the connection request response message containing the digital voice network media resource reservation request failure notification;

issuing, by a call terminating side server in response to the detecting, a configured error response message to initiate an alternative message connection between the originating mobile user equipment and a message file service, where the message file service comprises an interface facilitating receiving a message from the originating mobile user equipment to the terminating mobile user equipment.

20. The TAS of claim 19 wherein the message file service is a voicemail service.

21. The TAS of claim 19 wherein the message file service is a text message service.

22. The TAS of claim 19 wherein the message file service is an email message service.

23. The TAS of claim 19 wherein the digital voice network media resource reservation request is a voice over Long Term Evolution (VoLTE) media resource reservation request.

24. The TAS of claim 23 wherein the digital voice network media resource reservation request failure notification is a Session Initiation Protocol (SIP) error code.

25. The TAS of claim 23 wherein the digital voice network media resource reservation request failure notification is a Session Initiation Protocol (SIP) message including an audio port field set to zero.

26. The TAS of claim 23 wherein, during the issuing, the configured error response message is directed to a serving call session control function (S-CSCF) to initiate establishing the alternative message connection.

27. The TAS of claim 19 wherein the media resource reservation request failure notification arises from a DIAMETER request.

\* \* \* \* \*